United States Patent [19]

Barfod

[11] Patent Number: 4,580,055

[45] Date of Patent: Apr. 1, 1986

[54] SCINTILLATOR DETECTOR FOR EVENT-RELATED GROUPING

[75] Inventor: Jesper M. Barfod, Molle, Denmark

[73] Assignee: General Electric Company, Milwaukee, Wis.

[21] Appl. No.: 577,442

[22] Filed: Feb. 6, 1984

[51] Int. Cl.[4] .............................................. G01T 1/20
[52] U.S. Cl. .................................... 250/366; 250/369
[58] Field of Search ............. 250/361 R, 363.1, 363.7, 250/366, 369

[56] References Cited

U.S. PATENT DOCUMENTS

| 4,408,297 | 10/1983 | Theodosiou et al. | 250/369 |
| 4,413,183 | 11/1983 | Metal et al. | 250/369 |
| 4,486,663 | 12/1984 | Arseneau | 250/369 |

*Primary Examiner*—Janice A. Howell

*Attorney, Agent, or Firm*—Douglas E. Stoner; Alexander M. Gerasimow

[57] ABSTRACT

A gamma camera is provided with a bidirectional switching network between each of its photomultiplier tubes and its surrounding tubes, such that each tube may inform its neighboring tubes when it has acquired a scintillation event. All of those tubes which have so acquired a scintillation event are then treated as a cluster with one of the tubes acting as a coordinator for the entire cluster. Provision is made for validation of the signals within the cluster, and the outputs of the individual photomultiplier tubes within the cluster are then synchronously and collectively applied to the signal-processing circuitry for display. In this way, it is possible to process plural valid events which occur simultaneously to thereby increase both the current rate and the validity rate of an anger-type system.

19 Claims, 15 Drawing Figures

SCINTILLATOR DETECTOR FOR EVENT-RELATED GROUPING

BACKGROUND OF THE INVENTION

This invention relates generally to gamma cameras and more particularly to a circuit for synchronizing the outputs of multiple photomultiplier tubes for processing as a group.

One of the limiting characteristics of a nuclear imaging system is that of dead time, i.e., the time during which the system processes a single event and is therefore not available to process a succeeding event. A common way to reduce the dead time of a system is to provide redundancy by way of buffers in those parts of the processing cycle which are the slowest, such as, for example, in the energy or spatial correction functions. There are also other techniques that are applied to speed up the signal processing functions so as to thereby reduce the dead time of the system. Despite the use of these techniques, however, there are practical considerations that limit the speed at which the counts can be received and processed. This practical limit is generally considered to be around 200,000 counts per second for a typical conventional gamma camera. One reason for this limitation is that an array of photomultiplier tubes is only capable of receiving or processing one event at a time. That is, if two events occur simultaneously, or near simultaneously, at different locations anywhere in the array, then at least one of the events, and possibly both of the events, will be discarded. The usual occurrence will be for the event which is first to occur or first to be processed to be used and the other one to be discarded.

It may happen that both of the otherwise valid events are discarded because they are interpreted as a single event. For example, if two displaced events occur simultaneously, they may be viewed collectively as a single, brighter event at a position intermediate the two. In such case, the window-level discrimination may cause the event to be discarded because of its brightness exceeding the allowed threshold level. Such an elimination of two counts is therefore significant in reducing the count rate of the system.

Another undesirable phenomenon which might occur is that of interpreting two bad events as a single good event. This can occur where a pair of displaced, weak events are collectively seen as a single, brighter event located at a position intermediate the two. If that brighter event is within the prescribed brightness window, then it will be erroneously counted as a valid event to thereby contribute to the inaccuracy of the process.

OBJECTS OF THE PRESENT INVENTION

It is therefore an object of the present invention to provide a nuclear camera system which is capable of an increased count rate.

Another object of the present invention is the provision in a nuclear camera system for accepting multiple events that occur simultaneously or near simultaneously.

Yet another object of the present invention is the provision in a nuclear camera for distinguishing discrete events that occur simultaneously or near simultaneously and for considering them as individual events.

Still another object of the present invention is the provision in a nuclear camera for more accurately and reliably determining the validity of apparent scintillation events.

A further object of the present invention is the provision in a nuclear camera for more accurately and reliably measuring the photomultiplier tube outputs for application as representative signals informing an image display.

These objects and other features and advantages will become more readily apparent upon reference to the following description when taken in conjunction with the appended drawings.

SUMMARY OF THE INVENTION

Briefly, in accordance with one aspect of the invention, a gamma camera having a scintillation crystal and a plurality of photomultiplier tubes is provided with a communication network which allows for the synchronized processing of the output of all photomultipliers within a certain cluster. Provision is made for validation of the signals within the cluster, and the outputs of the individual photomultiplier tubes within a cluster are then synchronously and collectively applied to the signal processing circuitry for display.

By another aspect of the invention, each of the photomultiplier tubes in a gamma camera is provided with communication lines to and from each of its surrounding tubes. There is further provided a bidirectional switching network between each of the photomultiplier tubes and its surrounding tubes. Such an arrangement allows each tube to inform its neighboring tubes when it has acquired a scintillation event. Logic means is provided to recognize when adjacent tubes have similarly received a valid event and to responsively close the bidirectional switching means at that time. All of those tubes which are so interconnected are then treated together as a cluster, with one of the tubes acting as a coordinator for the entire cluster. Measurements are made at each of the clustered tubes, and their outputs are summed and compared with a discrimination window to determine whether they should be processed. If the summation is within the prescribed window, then the coordinating tube circuitry functions to synchronize the simultaneous application of the individual tube outputs to the anger-type signal processing circuitry for display. In this way, both the count rate and the validity rate can be increased. That is, since more than one cluster can exist at any time, it is possible to process valid events which occur simultaneously, a routine which has heretofore been impossible. Further, rather than each of the photomultiplier tube outputs being treated independently as in conventional systems, they are treated in combination with the other outputs in the cluster so as to thereby allow more reliable and accurate validation and measuring functions.

In one embodiment the validation logic is such that, in order for a signal from a particular photomultiplier tube to be found valid, it is necessary that from its surrounding tubes, there must be at least two adjacent tubes that have acquired a signal at that time. Provision is also made for invalidating a signal which has been active for more than a predetermined time period.

In the drawings as hereinafter described, a preferred embodiment is depicted; however, various other modifications can be made thereto without departing from the true scope and spirit of the invention.

DESCRIPTION OF THE PREFERRED EMBODIMENT

Figure 1:
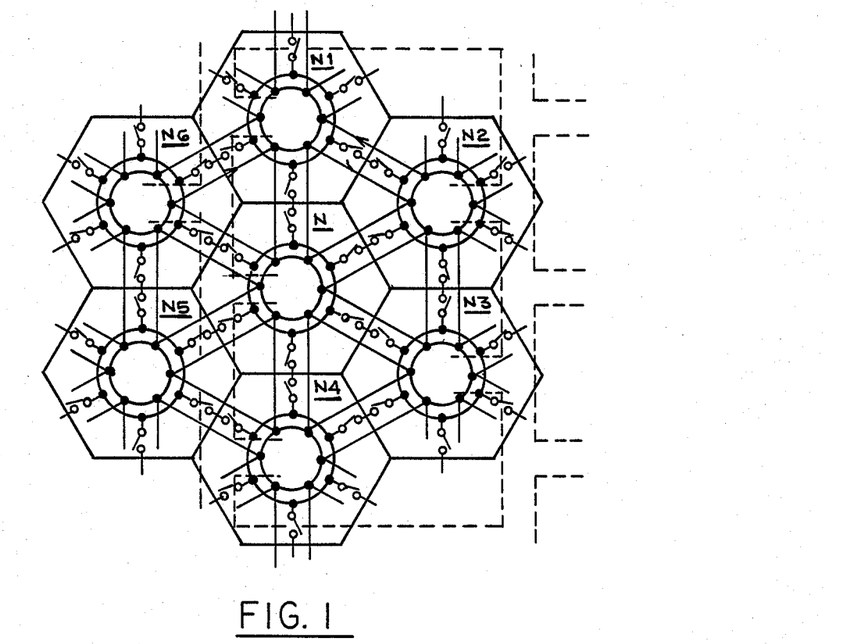
FIGS. 1 and 1A are schematic illustrations of a plurality of photomultiplier tubes and included intercommunication network in accordance with the preferred embodiment of the invention.

FIG. 1 shows an hexagonal photomultiplier tube N and its surrounding photomultiplier tubes N1 through N6 as they are normally arranged in a gamma camera having a scintillator crystal (not shown) and a plurality of photomultiplier tubes disposed adjacent thereto for receiving scintillation "events" in response to radiation exposure to the crystal. It is understood, of course, that there are normally more photomultiplier tubes in the array which are not shown for purposes of this description.

Unlike the arrangement in a conventional camera, each of the photomultiplier tubes N-N6 is interconnected to each of its neighboring photomultiplier tubes by a communication network as shown. That is, in FIG. 1, the photomultiplier tube N is shown as being individually connected to each of its neighboring photomultiplier tubes N1-N6, but it should be understood that each of the photomultiplier tubes N1-N6 is also connected in the same manner to each of its neighbors and so on throughout the complete array. The outermost photomultiplier tubes are, of course, so connected to only three or four photomultiplier tubes rather than the six to which the inner tubes are connected. The communication network is identical for each inner tube and is shown in greater detail in FIG. 1a.

Figure 1A:
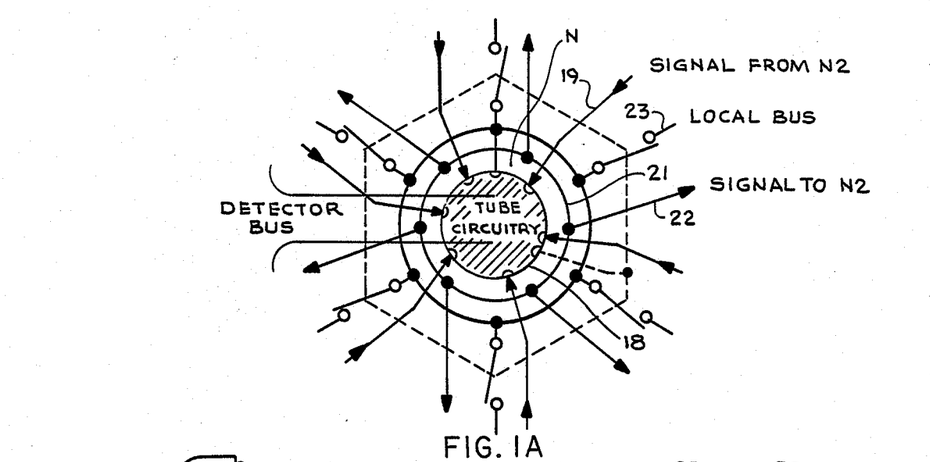

The photomultiplier tube N is shown schematically in FIG. 1A to include its outgoing and incoming communication network. A part of the circuitry 18 is provided to acquire signals from the neighboring photomultiplier tubes when those tubes have registered an event. For example, when the photomultiplier tube N2 registers an event, it will communicate this information to the photomultiplier tube N by way of a signal sent along line 19 to the circuitry 18. In the same way, each of the other photomultiplier tubes N1 and N3-N6 has incoming lines connected to the circuitry 18 as shown. Similarly, an outgoing bus 21 is included to provide an indication to its neighboring photomultiplier tubes when the photomultiplier tube N registers an event. Each of the outgoing lines are shown in FIG. 1A; however, for the sake of simplicity, only the one line 22 to tube N2 has been numbered.

Having established a communication linkage to inform the photomultiplier tubes of the status of their neighbors, provision is further made to transfer the respective output signals to one of the neighboring photomultiplier tubes for further processing in a coordinated manner. For example, let us assume that the photomultiplier tube N is the photomultiplier tube that will coordinate and control the processing of the associated signals. Let us further assume that each of the photomultiplier tubes N1-N6 has registered an event as a result of a scintillation in the crystal. The signals from the respective tubes will then be locally validated by circuitry to be described hereinafter. Assuming that the event is determined to be valid, the local bus 23, and the local busses associated with the other surrounding photomultiplier tubes, are closed to allow the respective output signals to be sent to the neighboring photomultiplier tubes. The local busses 23 include bidirectional switches as better shown in FIG. 1 to perform AND functions. That is, in order to complete the circuit, each of the photomultiplier tubes N and N2, for example, must close its switch in order to allow the output signal to pass from the photomultiplier tube N2 to the photomultiplier tube N. Similarly, photomultiplier tubes N1 and N3-N6 will close their switches and send their outputs to the neighboring photomultiplier. One of the photomultiplier tubes in the cluster will then access the processing circuitry, by way of the Detector Bus, as shown in FIGS. 1 (in dotted line) and 1A in a manner to be described more fully hereinafter.

It will be seen in FIG. 1 that the Detector Bus is linked to each of the individual photomultiplier tubes such that any one of those tubes can access the processing circuitry. In this regard, it should be recognized that, for any single scintillation event, any one of those tubes may be the controlling tube to coordinate the outputs of its neighbors. Further, it should be recognized that although the cluster is being described herein as constituting seven photomultiplier tubes, the cluster may just as well be constituted of a greater or lesser number of tubes (but at least three). The point to keep in mind is that, for any single event, a single photomultiplier tube will synchronize all of the photomultiplier tube outputs associated with that event and will then access the main detector bus for purposes of processing and display.

Figure 1B:
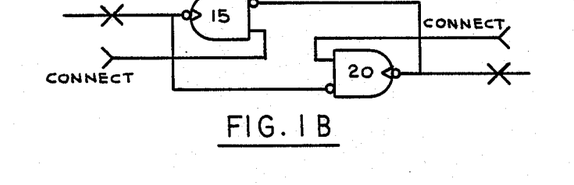
FIGS. 1B and 1C are schematic illustrations of alternative bidirectional digital and analog intercommunication networks, respectively.
Figure 1C:
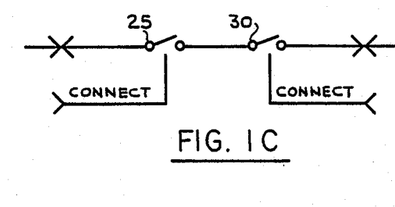

FIGS. 1B and 1C show alternative approaches that may be used to obtain the bidirectional switching capability that is employed in the structure described above. In FIG. 1B, a pair of open collector NAND gates 15 and 20 are connected in the manner shown to provide a digital bidirectional latching interconnection between neighboring tubes for a ground-true signal. In the FIG. 1C embodiment, a pair of switches 25 and 30, are so interconnected as to provide the desired feature for either an analog or digital interconnection.

Figure 2:
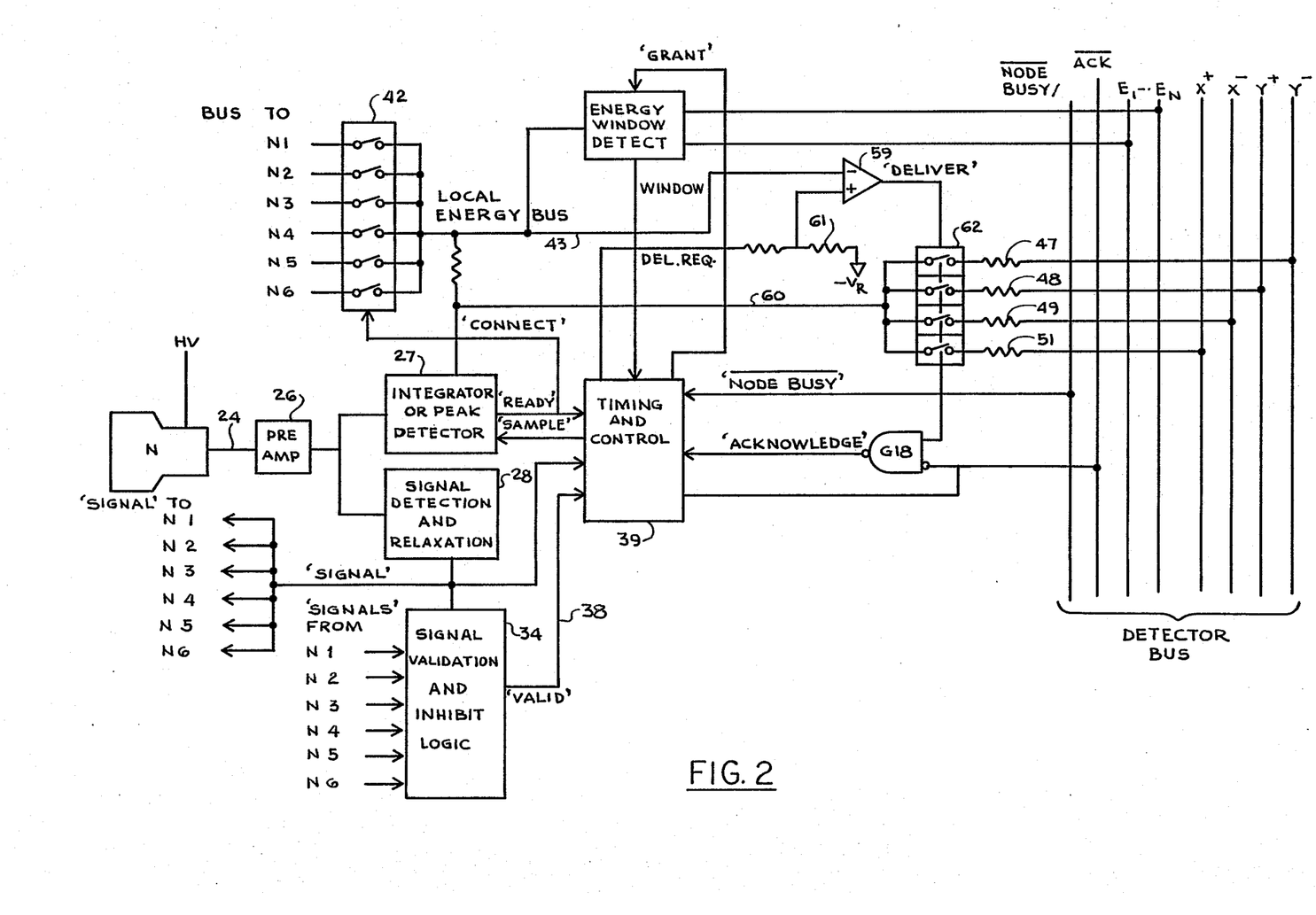
FIG. 2 is a schematic illustration of the validation and synchronization portion of the present invention.

Referring now to FIG. 2, there is shown the system circuitry for the single photomultiplier tube N, it being understood that each of the other tubes has corresponding circuitry. The analog signal from the photomultiplier tube N is applied along line 24 to a preamplifier 26 in a conventional manner. The output of the preamplifier 26 is applied to an integrator or peak detector 27 to be processed in a conventional manner but in response to logic control circuitry to be described hereinafter. The output of the preamplifier 26 is also applied to a Signal Detection and Relaxation Circuit 28 which acts as a buffer in deriving a digital signal for use in the validation process while preserving the integrity of the preamplifier output for purposes of later measurement.

Figure 3:
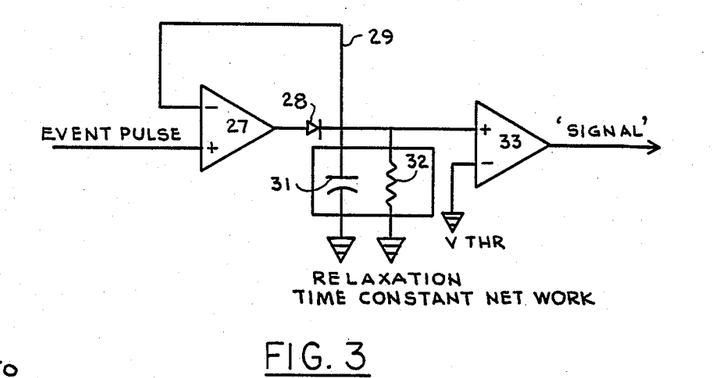
FIG. 3 is a circuit diagram of the signal detection and relaxation portion of the FIG. 2 network.

The Signal Detection and Relaxation Circuit 28 is shown in detail in FIG. 3. The output from the preamplifier 26 is applied to the positive terminal of an operational amplifier 27 of a voltage follower circuit having a diode 28 and a feedback loop 29. A capacitor 31 and resistor 32 are provided at the output to establish a relaxation time constant of a predetermined value. The circuit functions as a peak detector with its output being applied to the positive terminal of a comparator 33 having a threshold voltage $V_{THR}$ applied to its negative terminal. The result is a digital signal output, referred to hereinafter as 'SIGNAL' which is indicative of an event having been detected by its associated photomultiplier tube, N in this case.

As shown in FIG. 2, the 'SIGNAL' is applied to the neighboring photomultiplier tubes N1-N6 in the manner described above. Similarly, digital 'SIGNAL's will be received from the neighboring photomultiplier tube N1-N6 and will be applied, along with the 'SIGNAL' emanating from tube N, to the Signal Validation and Inhibit Logic Circuit 34.

Figure 4:
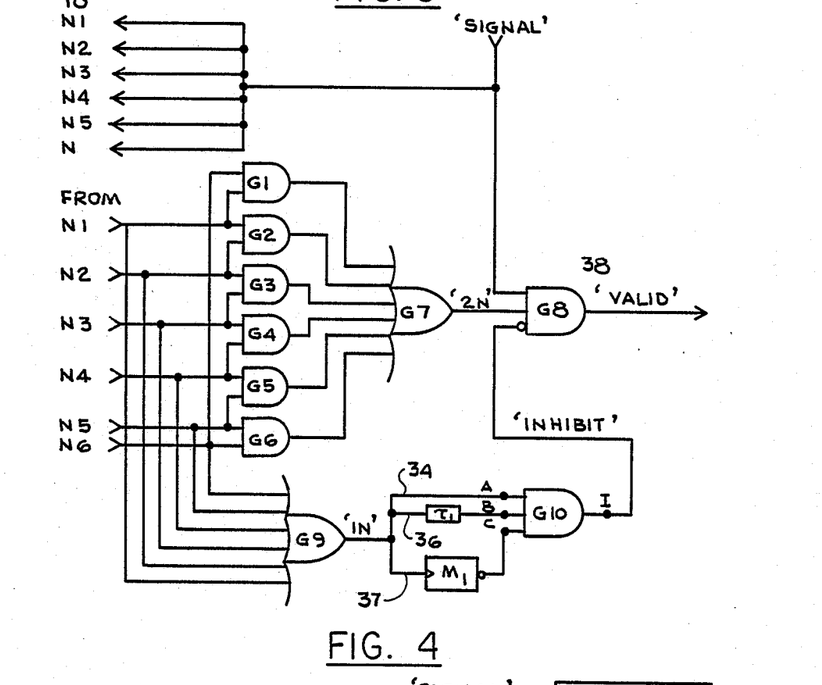
FIG. 4 is a logic diagram of the signal validation and inhibit portion thereof.

The Signal Validation and Inhibit Logic Circuit 34 is shown in detail in FIG. 4 to include a plurality of AND gates G1-G6 with each gate having inputs from a pair of adjacent tubes in the N1-N6 cluster. For example, for the gate G1 to turn on, it is necessary that a signal be received from both the N1 and N6 photomultiplier tubes. The outputs of the G1-G6 gates are applied to an OR gate G7 whose output is in turn applied to AND gate G8. Also being applied to the AND gate G8 is the 'SIGNAL' from the Signal Detection and Relaxation Circuit 28. Accordingly, if there is a 'SIGNAL' resulting from an event in photomultiplier tube N, and if there are associated signals from any two adjacent tubes from the cluster surrounding the photomultiplier tube N, then the 'SIGNAL' should be valid and the gate G8 should have a positive output indicating so. However, as shown in FIG. 4, there is also an inhibit terminal at the input of gate G8 which may still invalidate the "signal."

Figure 4A:
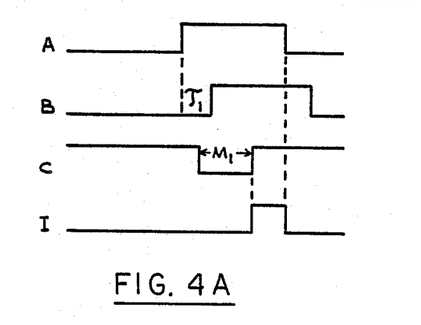
FIGS. 4A and 4B are timing diagrams representative thereof.

Inhibiting circuitry at the bottom of FIG. 4 is provided to invalidate the 'SIGNAL' in the event that any one of the neighboring tubes N1-N6 has been active for more than a predetermined allowed time. This may occur when a preamplifier saturates, or where a photomultiplier tube is faulty, or where a pair of events are registered in very close succession, for example. The OR gate G9 will turn on when a signal is received from any one of the N1-N6 tubes. The output of the G9 gate is applied to three parallel arms going into the AND gate G10. The one input line 34 is a direct line, another line 36 has an aperture delay $\tau_1$ applied thereto, and the third line 37 has the Formation Aperture $M_1$ applied thereto. Should all three of these inputs be high, then the G10 output will be high, which will in turn cause the G8 output to be inhibited to invalidate the 'SIGNAL'. As will be seen in FIG. 4A, the Formation Aperture $M_1$, which provides a low at point C, is triggered at the same time (except for the gate delay shown) that the first neighbor (as appearing at point A in this case) goes high. If the tube in consideration raises its 'SIGNAL' high in close coincidence (<$M_1$) with the first of the neighbors, and contemporary activity is registered in two neighboring tubes (2N high), then the output of G8 wil be high for the rest of the validation period ($M_1$). The delay $\tau_1$ is provided in line 36 to ensure that there is sufficient time for the Formation Aperture $M_1$ to come into play.

Figure 4B:
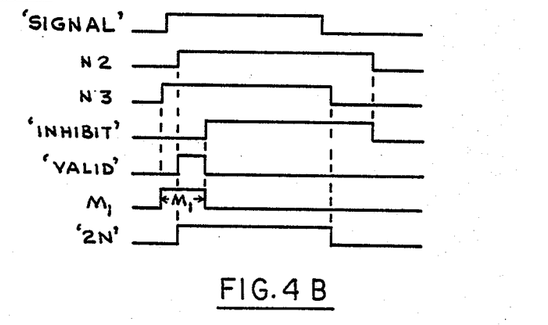

The logic circuitry of FIG. 4 operates as shown by the typical timing diagram shown in FIG. 4B. In that example, there are signals originating from the N3, N2, and N ('SIGNAL') tubes in that order. The N3 signal causes the $M_1$ signal to go high so as to initiate the formation aperture. Both the '2N' and the 'VALID' signals are caused to go high when the second neighboring signal (i.e., the N2 signal) is received. It will be seen that, at the end of the formation aperture $M_1$, all three of the tube signals remain. Accordingly, the 'INHIBIT' is triggered at that time, and the 'VALID' signal is caused to go low so as to thereby invalidate the process. When the N3 signal drops to zero, the '2N' signal also drops to zero. When the N3 and N2 signals have dropped to zero, the 'INHIBIT' signal then also drops to zero to reset the circuit.

Referring again to FIG. 2, and assuming now that the gate G8 has a positive output indicating that the 'SIGNAL' is valid, a positive 'VALID' signal will be applied along line 38 to the timing and control circuitry 39 shown in FIG. 2. That portion of the timing and control circuitry 39 which now becomes active is shown in FIG. 5.

When a 'VALID' signal pulse is applied to a latching flip-flop 41, a 'CONNECT' signal is applied to the local bus switches shown collectively at 42 (FIG. 2) so that each of the neighboring tubes N1-N6 is connected to the local energy bus 43 (using the circuitry of FIG. 1C). In this way, the outputs of the individual tubes are summed for window discrimination purposes as will be described hereinafter.

Figure 5:
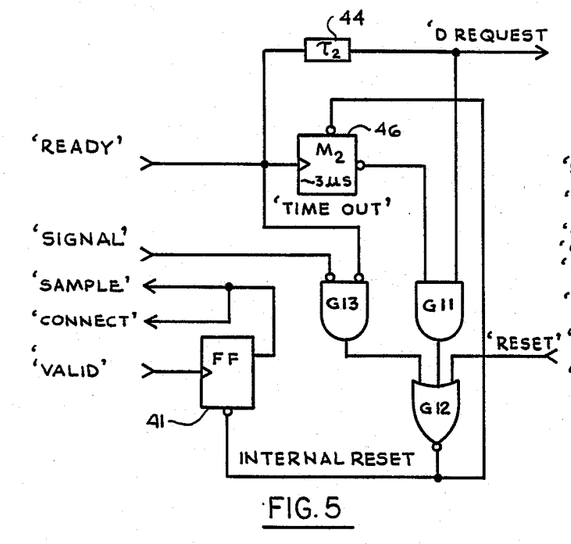
FIG. 5 is a logic diagram showing the timing and control portion of the invention.

The flip-flop 41 of FIG. 5 also asserts a 'SAMPLE' signal to the integrator 27 which acts to release the signal measurement circuit from a clamped condition and starts the signal measurement process to be made in a conventional manner, such as by integration, peak detection, or the like. When measurement is completed, a 'READY' signal is returned to the Timing and Control circuitry (FIG. 2). The 'READY' signal, which activates the logic circuitry of FIG. 5, is applied first to a time delay circuit 44 which then generates a 'DELIVER REQUEST' signal for application in a manner to be described hereinafter. For purposes of resetting the internal logic of the system, the 'READY' signal is also applied to start a time-out monostable 46. The output of the monostable 46 is applied, along with the 'DELIVER REQUEST' signal to an AND gate G11 whose output in turn is applied to a NOR gate G12. Also applied to the NOR gate G12 is an output from an AND gate G13 having inverted inputs from both the 'SIGNAL' and 'READY' signals. A third input into the NOR gate G12 is the 'RESET' signal as applied to an inverted terminal. This logic circuitry works in such a way as to allow: (1) the 'RESET' signal; or (2) the 'SIGNAL' and 'READY' signal, both low; or (3) the 'D. REQUEST' high and time out expired, to reset the flip-flop 41 and eventually the timer 46.

Figure 5A:
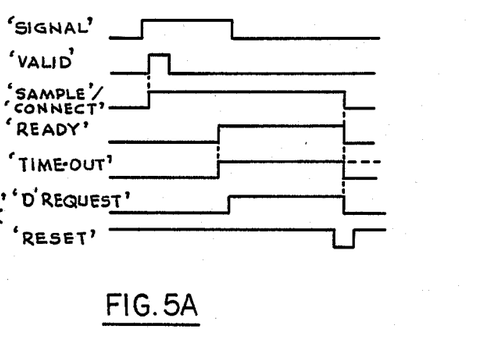
FIG. 5A is a timing diagram representative thereof.

The timing diagram of FIG. 5A shows that soon after a 'SIGNAL' is received, the 'VALID' signal goes high and the 'SAMPLE' and 'CONNECT' signals also go high. When the sample has been taken and the measurement has been made, a 'READY' signal is then sent back and that in turn causes the 'TIME' OUT' signal to go high. After a delay of a prescribed time, $\tau_2$, the 'DELIVER REQUEST' signal goes high. When the 'RESET' signal goes low, all of the other signals are caused to go low so as to thereby reset the circuit for the next signal.

Figure 6:
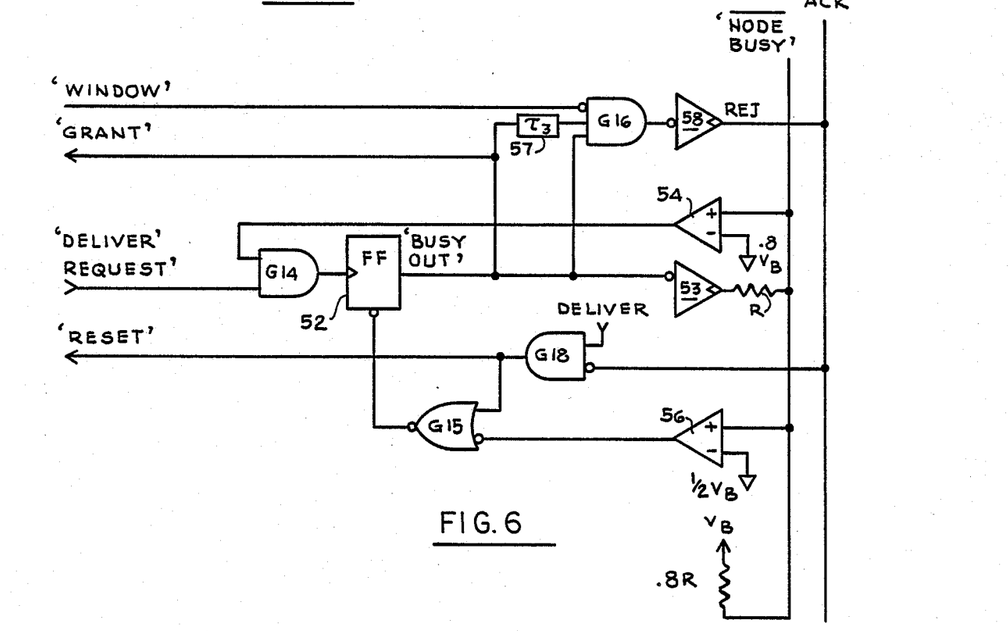
FIG. 6 is a schematic illustration of one embodiment of the bus acquisition and contention portion of the invention.

The 'DELIVER REQUEST' signal resulting from the circuitry of FIG. 5 is applied as shown in FIGS. 2 and 6. The 'DELIVER REQUEST' signal indicates that a synchronized delivery of information from interconnected photomultiplier tubes is now ready to occur. This signal is developed by all tubes in the detector that have reached the proper state. The bus contingent logic of FIG. 6 (or FIG. 7) ensures that one, and only one, circuit takes the action of synchronizing information delivery (and then only one from within its cluster) to the anger nodes shown in FIG. 2. The anger nodes shown as X+ and X−, Y+ and Y−, together with their respective resistances 47, 48, 49, and 51, are of the conventional type to which the photomultiplier tube output signals are applied in a manner to be described.

Figure 6A:
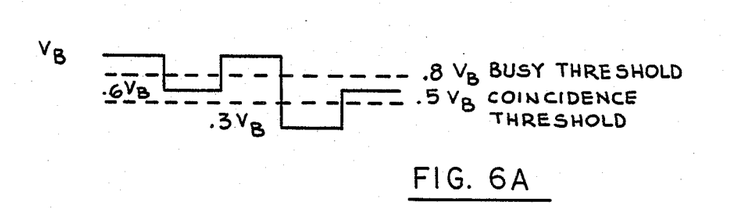
FIG. 6A is a schematic illustration of comparative voltage levels therein.

Referring now to FIG. 6, there is shown the bus handshake and contention logic which controls access to the bus. The 'DELIVER REQUEST' signal is applied to an AND gate G14 whose output clocks a flip-flop 52 which provides a 'BUSY OUT' signal at its output. The 'BUSY OUT' signal is applied to a logic inverter 53 having an open collector output which acts to connect the 'NODE BUSY' line to ground through the resistance R. This causes the normal voltage $V_B$ on the 'NODE BUSY' line to drop to 0.6 $V_B$ as shown in FIG. 6a. This in turn causes the 'NODE BUSY' line to be "busy" to all other interface circuits. That is, as long as the 'BUSY OUT' signal from flip-flop 52 subsists, the voltage on the 'NODE BUSY' line will remain at 0.6 $V_B$ and no other circuit can access the line. To show what occurs in the other circuits, let us assume that the 'NODE BUSY' line was "busy" when the 'DELIVER REQUEST' was applied to the gate G14 in FIG. 6. The comparator 54, having a threshold above 0.6 $V_B$ (e.g., 0.8 $V_B$) will then go low and the AND gate G14 will not turn on. However, as soon as the 'NODE BUSY' line is free, its voltage will again go back to $V_B$ and, since it exceeds the 0.8 $V_B$ busy threshold of comparator 54, the comparator 54 will go high to turn on gate G14 and clock flip-flop 52 to provide the 'BUSY OUT' signal. The respective voltage levels of the comparators and the Node Busy line are shown in FIG. 6a.

Figure 7:
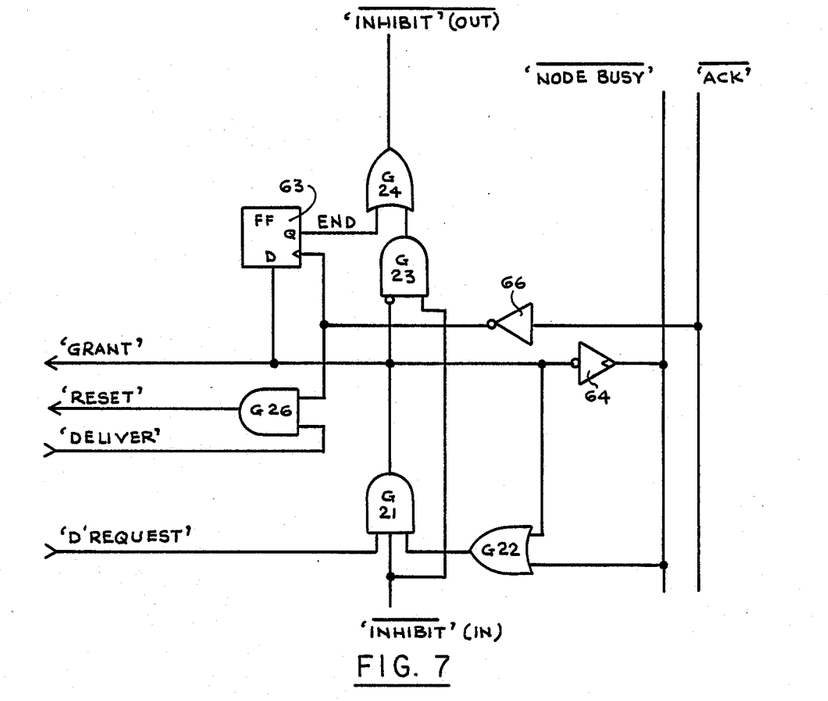
FIGS. 7 and 7A are schematic illustrations of another embodiment of the bus acquisition and contention portion of the invention, together with a representative timing diagram thereof.

In addition to providing for the "busy" condition, there is also provision for accommodating a coincident condition wherein two of the circuits act to acquire the bus at the same time. This is likely to occur with circuits which are in the same interconnected cluster for a single event. When this occurs, the voltage on the 'NODE BUSY' will drop to 0.3 $V_B$, which is below the 0.5 $V_B$ coincident threshold of the comparator 56, (see FIG. 6a) to thereby reset the flip-flop 52 by way of the inverted NOR gate G15. The same will occur with any other coinciding circuit(s). When the flip-flop has been reset, the 'NODE BUSY' voltage is again raised to the $V_B$ level, and a second clocking of the flip-flop is attempted. Because of the different threshold and propagation delays that are most likely inherent in the circuits, only one photomultiplier tube circuit is likely to take precedence in the second try to access the 'NODE BUSY' line. However, if one wishes to avoid the possibility of sustained oscillation until time-out occurs, a bus-contention condition can be made to result in a 'RESET' of the entire cluster of photomultiplier tube circuits, or, alternatively, a slightly more complicated "daisy-chain" approach may be used as shown in FIG. 7 and as described hereinafter.

Referring again to the 'BUSY OUT' signal coming from the flip-flop 52, it is now applied to the Energy Window Detect circuit 55 as a 'GRANT' acknowledge (see FIGS. 2 and 6). The Energy Window Detect circuit 55 is of a conventional type having upper and lower ranges within which the measured energy must fall in order to qualify for further processing. As will be seen in FIG. 2, the energy that is measured is the summation of the output of all of the photomultiplier tubes N1–N6 as it appears on the local energy bus 43. It is important to recognize that, since the bus is a current-summing node, there is only one photomultiplier tube circuit in a cluster that measures the common activity on the local energy bus 43 at a particular time.

As will be seen in FIG. 6, the 'BUSY OUT' signal is also applied to a delay circuit 57 and, hence, to an AND gate G16. Accordingly, after the 'BUSY OUT' signal has been active continuously for more than a predetermined time period $\tau_3$, the result of the window measurement is applied to the gate G16. If the sum of the outputs from all of the tubes is found to be outside of the predetermined energy window(s), the 'WINDOW' signal will be low. The logic inverter 58 will then provide a 'REJECTION' signal to the 'ACKNOWLEDGE' line, which in turn will act through the AND gate G18 to reset all of the circuits in the cluster (all having 'DELIVER' high).

As mentioned above, the 'GRANT' signal causes the Energy Window Detect circuit 55 to measure the summed outputs of the neighboring and connected photomultiplier tubes in the particular cluster. A second function of the window discriminator is to initiate the energy delivery to the anger matrix. It does this by first taking the local energy node 43 to ground potential. This condition is then detected by a 'DELIVER' comparator 59 (FIG. 2) which had previously received at its positive terminal, a 'DELIVERY REQUEST' signal by way of voltage divider 61. Such a 'DELIVER' comparator is activated in each of the photomultiplier tubes involved in the cluster so that each one closes its set of switches 62 which connects the respective tube outputs to the anger summing nodes X+, X−, Y+, and Y− by way of the matrix resistors 47–51. For example, the output of the photomultiplier tube N would then pass from the measuring device 27 along line 60, through the switches 62 to the anger nodes X+, X−, Y+, and Y−. Similarly, and at the same time, the photomultiplier tubes N1–N6 would have their outputs applied through their respective switching devices to the anger nodes. In this way, the processing circuitry of a controlling photomultiplier tube, tube N in this case, acts to, first of all, measure the combined outputs of the neighboring tubes to ensure that the sum is within the allowed threshold(s) and, secondly, to synchronize the application of their outputs to the anger nodes by the action of taking the local summing bus to zero potential. From that point, the processing circuitry operates in a conventional manner to display the event on a CRT or the like. When the signal-processing circuitry has acquired the signal, an 'ACKNOWLEDGE' signal is applied through NOR gate G17 and AND gate G18 to reset all tube circuits which have the 'DELIVER' signal active.

Figure 7A:
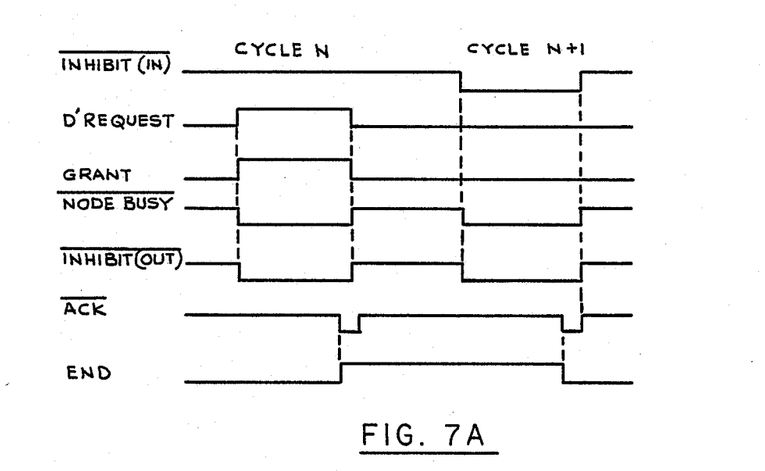

Referring now to FIGS. 7 and 7A, there is shown a so-called "daisy chain" approach for accommodating a coincident condition wherein two of the circuits act to acquire the bus at the same time. There are a plurality of such circuits connected serially in a ring, such that one circuit's INHIBIT/ (OUT) is connected to the next circuit's INHIBIT/ (IN). It is not necessary that each tube has such a circuit but, rather, that certain tubes be chosen to act as "delivery synchronizers" which, because of the nature of the validating logic, will be representative of all of the tubes. For example, where the validity criterion requires at least two adjacent neighboring tubes receive coincident signals as described above, then only one third of the total number of tubes needs to be equipped with the FIG. 7 circuitry to act as their delivery synchronizer. The sequence of connecting is preferably random rather than systematic.

As will be seen, each circuit has a flip-flop 63 which controls the continuation of the daisy chain. Initially, all of the flip-flops are reset except for one, with that one breaking the ring at one place. The 'INHIBIT' (out) signal from the circuit with the flip-flop set will always be high indicating that the following circuit will have the highest priority in case of bus access coincidence.

Assuming that the circuit with the flip-flop set is just below the circuit of FIG. 7 so that the 'INHIBIT' (in) of FIG. 7 is high (not active), the circuit operates as follows: A 'DELIVER REQUEST' is applied to the AND gate G21 and, assuming that the 'NODE BUSY' signal as applied to the OR gate G22 is high, the output of the AND gate G21 is high to thereby assert a 'GRANT' signal. This high signal as applied to the inverter 64 asserts the 'NODE BUSY' line to a low condition. The OR gate G22 provides a latching function for the 'GRANT' condition (as long as 'D. REQUEST' persists and 'INHIBIT (IN)' is high (not active). The inverted output of the AND gate G21 is applied to the AND gate G23, along with the high signal from the 'INHIBIT' (in). The output of the AND gate G23 is then applied to the OR gate G24 which in turn causes the 'INHIBIT' (out) signal to go low unless the flip-flop 63 is set to indicate the end of the chain. The signal path from 'INHIBIT (IN)' to G23 through G24 to 'INHIBIT (OUT)' ensures for other circuits that the inhibit signal is carried through the rest of the ring.

The 'GRANT' signal indicates to the logic that the bus has been acquired, and the 'NODE BUSY' signal acts to prevent all of the circuits from acquiring the bus until it has been released. Release is accomplished by the 'ACK' signal which is applied through the inverter 66 to the AND gate G26 to reset the circuit logic. The 'ACK' signal also acts to latch the 'GRANT' signal in the flip-flop 63 to thereby reconfigure the ring such that the last circuit synchronizing delivery of data will now be the one with the lowest priority in the next delivery cycle. Such a chain structure ensures that in a very short period of time (at most, the propagation delay time for 'INHIBIT' to travel through the entire chain), the circuit first in the chain will gain precedence and will acquire the bus by sending 'INHIBIT' signals backwards in the ring and thereby ensuring that all 'GRANT' signals in circuits farther back in the ring are set to zero by means of gate 21. As mentioned above, the 'INHIBIT' signal is passed through the circuits by means of gates G21 and G23 until the end of the ring.

With reference to FIG. 7A, the left part thereof depicts the timing for a synchronized information delivery tube circuit under consideration. The delivery cycle is completed by ACK going low and END going high, indicating that the circuit under consideration is now terminating the ring. The right part of FIG. 7A depicts the timing of signals for the circuit under consideration when another tube circuit with higher priority in the ring is synchronizing information delivery from a tube cluster. The Bus control signals, NODE BUSY and ACK, are exercised as before, whereas INHIBIT (IN) and INHIBIT (OUT) are asserted in consequence of the active circuit higher priority. Terminating the delivery cycle is the assertion of ACK, which will now reset the END signal of the circuit under consideration (since this circuit was not the synchronizing circuit) and, hence, shift the end position of the ring to the last active synchronizing circuit.

It should be mentioned that the lower prioritized circuit may experience a very short 'GRANT' signal that could be suppressed by appropriate means if necessary. However, since the 'GRANT' signal will not persist for a significant period of time, a 'RESET' signal will not be received when the 'ACK' signal is asserted. Accordingly, provision is not made for suppressing those short signals.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

What is claimed is:

1. A circuit for reducing dead time in a scintillation camera having a cluster of light-sensing devices for receiving photons from an adjacent crystal in response to scintillation events occurring within the crystal and for generating representative output signals which can be processed for mapping the location and magnitude of those events comprising:
   means for sending signals to and receiving signals from the light-sensing devices immediately surrounding at least one of the light-sensing devices in the cluster when said at least one light-sensing device records an event;
   logic means for determining the validity of said event in response to the signals received from said immediately surrounding light-sensing devices; and
   means for processing the output signals representative of the event only if said event has been determined to be valid.

2. A circuit as set forth in claim 1 wherein said signal sending means comprises a circuit for generating a digital signal in response to an analog output from a light-sensing device.

3. A circut as set forth in claim 1 wherein said logic means includes a plurality of logic gates whose output provides an indication of validity only when there is at least one signal from a neighboring light-sensing device to indicate that the neighboring light-sensing device has also recorded an event.

4. A circuit as set forth in claim 3 wherein said logic means includes logic circuitry for invalidating said event when a signal received from a neighboring light-sensing device persists for a predetermined threshold time period.

5. A circuit as set forth in claim 1 and including a plurality of matrix nodes to which the representative output signals are applied and further wherein said output signal processing means includes means for synchronizing the application of the output signals from a plurality of light-sensing devices such that they are applied to said matrix nodes at substantially the same time.

6. A circuit for communicating between one light-sensing device in a scintillation camera and a cluster of light-sensing devices immediately surrounding said one light-sensing device when said one light-sensing device responds to a scintillation event comprising:

a plurality of pairs of leads connected to said one light-sensing device with each pair being connected to one of said surrounding light-sensing devices so that said one light-sensing device can send signals to and receive signals from each of said surrounding light-sensing devices when said one light-sensing device responds to a scintillation event;

a plurality of busses connected to said one light-sensing device with each bus being connected to one of said surrounding light-sensing devices; and bidirectional communication means associated with each of said busses for selectively completing a bus circuitry between the associated surrounding light-sensing devices and said one light-sensing device such that a representative signal can be transmitted to said one light-sensing device when said surrounding light-sensing devices respond to a scintillation event.

7. A circuit as set forth in claim 6 wherein said light-sensing devices comprise photomultiplier tubes.

8. A circuit as set forth in claim 6 and including means associated with said plurality of pairs of leads for sending signals to said surrounding light-sensing devices when said one light-sensing device responds to a scintillation event and for receiving signals from said surrounding light-sensing devices when said surrounding light-sensing devices respond to a scintillation event.

9. A circuit as set forth in claim 6 and including summing means associated with said plurality of busses for summing said representative signals from said surrounding light-sensing devices.

10. A circuit as set forth in claim 6 wherein said communication means comprises a bidirectional communication means for transmitting a representative signal from said one light-sensing device to said surrounding light-sensing device.

11. A descrimination circuit for use with the scintillation camera having a plurality of light-sensing devices for receiving photons from a crystal in response to scintillation events within the crystal and for processing the resultant output signals to form an image comprising:

means for each light-sensing device to communicate with its adjacent light-sensing device when said each light-sensing device detects an event;

means for validating said event when at least one adjacent light-sensing device indicates an associated event detection within a predetermined period following the detection by said each light-sensing device; and means for processing only those output signals representative of valid events.

12. A discrimination circuit as set forth in claim 11 wherein said communication means comprises a plurality of pairs of electrical leads with each of said pairs connecting one of said adjacent light-sensing devices to said each light-sensing device.

13. A discrimination circuit as set forth in claim 11 and including signal generating means associated with each light-sensing device and with each of its adjacent light-sensing devices for generating representative signals in response to an event detection.

14. A discrimination circuit as set forth in claim 11 wherein said validating means comprises a logic network which provides an output signal representative of a valid event only when at least a pair of adjacent light-sensing devices indicate an associated event detection and only when said pair are themselves adjacent.

15. A discrimination circuit as set forth in claim 11 wherein said processing means includes means for connecting said each light-sensing device and said adjacent light-sensing devices to a plurality of matrix busses for processing their resultant output signals, and further wherein synchronizing means are provided for ensuring that the output signals from said each light-sensing device and said adjacent light-sensing devices all are connected to said plurality of matrix busses at substantially the same time.

16. A circuit for synchronizing the processing of output signals from a plurality of photomultiplier tubes in a scintillation camera comprising:

communication means between at least one of said photomultiplier tubes and at least one other adjacent photomultiplier tube for providing notice to said one photomultiplier tube of the existence of an output signal from said other photomultiplier tube;

switching means for selectively connecting the output of both of said one photomultiplier tube and said other photomultiplier tube to a plurality of matrix terminals for processing other output signals; and synchronization means for ensuring that the outputs from said one photomultiplier tube and from said other photomultipliertube are connected to said plurality of matrix terminals at substantially the same time.

17. A synchronizing circuit as set forth in claim 16 and including validation means associated with said communication means for validating the output of said one photomultiplier tube on the basis of the output from said other photomultiplier tube.

18. A synchronizing circuit as set forth in claim 16 wherein said switching and synchronization means comprises a multiple switch device associated with each of said one photomultiplier tube and said other photomultiplier tube, and a common activation means for closing both of said switch devices in response to control signals from said one photomultiplier tube.

19. A synchronizing circuit as set forth in claim 16 wherein said at least one other adjacent photomultiplier tube comprises a plurality of adjacent photomultiplier tubes and further wherein discrimination circuitry is provided to selectively sum the outputs of the plurality of adjacent photomultiplier tubes and to compare the resulting sum with at least one predetermined threshold value to determine whether the output signals should be processed.

* * * * *

UNITED STATES PATENT AND TRADEMARK OFFICE
CERTIFICATE OF CORRECTION

PATENT NO.   : 4,580,055
DATED        : April 1, 1986
INVENTOR(S)  : Jesper M. Barfod It is certified that error appears in the above-identified patent and that said Letters Patent is hereby corrected as shown below:

Col. 2, line 6, change "informing" to --in forming--.
Col. 7, line 3, change " 'TIME' OUT' " to --'TIME OUT'--.
Col. 7 and Col. 9, all occurrences, change " 'NODE BUSY' " to --'NODE BUSY'--.
Col. 11, line 47, change "descrimination" to --discrimination--.

Signed and Sealed this

Thirtieth Day of December, 1986

Attest:

DONALD J. QUIGG

Attesting Officer

Commissioner of Patents and Trademarks